(12) United States Patent
Takada et al.

(10) Patent No.: US 6,497,978 B1
(45) Date of Patent: Dec. 24, 2002

(54) EXPLOSION-PROOF SAFETY VALVE ASSEMBLAGE FOR A SECONDARY BATTERY

(75) Inventors: Akiyoshi Takada, Shiga-ken (JP); Kinji Saijo, Yamaguchi-ken (JP); Kazuo Yoshida, Yamaguchi-ken (JP); Nobuyuki Yoshimoto, Yamaguchi-ken (JP); Yoshihiko Isobe, Yamaguchi-ken (JP)

(73) Assignees: Toyo Kohan Co., Ltd., Tokyo (JP); Fukuda Metal Foil & Power Co., Ltd., Kyoto (JP)

( * ) Notice: Subject to any disclaimer, the term of this patent is extended or adjusted under 35 U.S.C. 154(b) by 0 days.

(21) Appl. No.: 09/445,300

(22) PCT Filed: Jun. 5, 1998

(86) PCT No.: PCT/JP98/02508
§ 371 (c)(1),
(2), (4) Date: Mar. 2, 2000

(87) PCT Pub. No.: WO98/56055
PCT Pub. Date: Dec. 10, 1998

(30) Foreign Application Priority Data

Jun. 5, 1997 (JP) .............................................. 9-162026

(51) Int. Cl.[7] .............................................. H01M 02/08
(52) U.S. Cl. .......................... 429/185; 429/55; 429/57; 429/186
(58) Field of Search .............................. 429/57, 59, 53, 429/55, 185, 176, 54, 161, 61, 56, 186

(56) References Cited

U.S. PATENT DOCUMENTS 5,688,294 A * 11/1997 Mizuno et al. ............ 29/623.2
6,040,087 A * 3/2000 Kawakami ................ 429/218.1

FOREIGN PATENT DOCUMENTS

| JP | 8339793 | * 12/1996 | .......... H01M/02/12 |
| JP | 1140123 | * 12/1999 | .......... H01M/02/12 |

* cited by examiner

Primary Examiner—Stephen Kalafut
Assistant Examiner—R. Alejandro
(74) Attorney, Agent, or Firm—Browdy and Neimark

(57) ABSTRACT

The object of the present invention is to provide an explosion-proof safety valve assemblage having a lead cap which allows some of the manufacturing man-hour in the process such as precision working and positioning to be deleted, since the lead cap is integrally formed with an explosion-proof safety valve and serves to provide a current circuit in a battery in place of a conventional one composed of lead plate or lead wire which requires such precision working and positioning operations, and to provide a closed secondary battery using the above mentioned safety valve assemblage. An explosion-proof safety valve assemblage for use in a closed secondary battery comprising an outer container, an electrode element, consisting of a positive electrode, negative electrode, and a separator, accommodated in said outer container, wherein said safety valve assemblage is sealingly secured to an open end portion of said outer container via an insulating gasket integrally with a closing cap, and it consists of an explosion-proof safety valve element, a coreless disc-shaped insulator, and a lead cap formed of a metal substrate and a metal foil laminated to the metal substrate, substantially the center of which is provided with an opening, and a closed secondary battery using the above mentioned safety valve assemblage.

7 Claims, 5 Drawing Sheets

EXPLOSION-PROOF SAFETY VALVE ASSEMBLAGE FOR A SECONDARY BATTERY

CROSS REFERENCE TO RELATED APPLICATION

The present application is the national stage under 35 U.S.C. 371 of PCT/JP98/02508, filed Jun. 5, 1998.

BACKGROUND OF THE INVENTION

1. Technical Field of the Invention

The present invention relates to an explosion-proof safety valve assemblage having a lead cap capable of rapidly breaking the current of a closed battery and releasing gas when the internal pressure of the battery is elevated due to the gas generated by overcharging the battery or due to a short circuit in the battery, and relates to a closed secondary battery using it.

2. Prior Art

Recently with increasing demand for electronic devices that are made much smaller in size, are portable and have enhanced performance, non-aqueous electrolyte secondary batteries with high energy density have been popularly used as power sources for them. Since the non-aqueous electrolyte secondary battery uses an alkali metal like lithium as an active material for positive and negative electrodes thereof, it employs a container of sealed structure so that such alkali metal may not react with water in the atmosphere.

Such a non-aqueous electrolyte secondary battery of sealed structure has a merit of storability, but reversely, there arises a problem due to the very high sealability. Namely, if exposed to high temperature or mishandled, such closed secondary battery using non-aqueous electrolyte will suffer an abnormal elevation of its own internal pressure and even a burst of itself finally. For example, if a lithium secondary battery is supplied with more than a rated current and overcharged, or the battery is mishandled thereby to cause a short circuit of the positive electrode and the negative electrode, inducing a large current into the battery, the non-aqueous electrolyte in the electrode element is sometimes decomposed to generate gas. If such gas fills the container of sealed structure mentioned above, the internal pressure of the battery is abnormally elevated and the battery at last bursts itself.

Accordingly, an electronic device using such non-aqueous electrolyte secondary battery as an electric source may suffer damage.

So far, there is known a closed secondary battery using non-aqueous electrolyte which is provided with an explosion-proof mechanism for preventing such burst of battery as mentioned above.

For example, Japanese Patent Laid-open Publication No. HEI-6-215760 discloses an explosion-proof mechanism of a closed non-aqueous electrolyte secondary battery, which is provided with a valve diaphragm disposed above an electrode element accommodated in a cylindrical outer container of a battery having a bottom and provided with a lead for breaking current disposed above the valve diaphragm. When the internal pressure of the battery is elevated, the above mentioned valve diaphragm is transformed upward so as to rupture the lead for breaking current to cut the current and at substantially the same time the valve diaphragm ruptures to release the internal pressure of the battery.

However, such closed non-aqueous electrolyte secondary battery provided with the conventional explosion-proof mechanism has a problem. Namely, it is necessary for such battery to have a lead plate or lead wire precisely worked in order to attain reliable breaking of the current thereof. It is also necessary to pay attention-in particular to the positioning of the lead plate or lead wire when it is being assembled into a battery in the manufacturing operations. Thus, the manufacturing process for this type of secondary battery should include a non-negligible amount of man-hour in the process in order to obtain a desired mechanism.

OBJECTIVE OF THE INVENTION

Therefore, it is an object of the present invention to provide an explosion-proof safety valve assemblage and a closed secondary battery using it, in which a lead cap is integrally formed with an explosion-proof safety valve in place of the conventional lead plate or lead wire for composing a current circuit of the battery, so that some of the manufacturing man-hour in the process such as precision working and positioning of the lead plate or lead wire, which are required in the manufacturing process of the conventional closed secondary battery, can be deleted. According to the present invention, it is also possible to improve the yield of the product and reduce the manufacturing cost thereof

SUMMARY OF THE INVENTION

To achieve the above mentioned object in a first embodiment, there is provided an explosion-proof safety valve assemblage for use in a closed secondary battery comprising an outer container, an electrode element, consisting of a positive electrode, negative electrode, and a separator, accommodated in said outer container, wherein said explosion-proof safety valve assemblage is sealingly secured to an open end portion of said outer container via an insulating gasket integrally with a closing cap, and said safety valve assemblage consists of a safety valve element, a coreless disc-shaped insulator, and a lead cap formed of a metal substrate substantially the center of which is provided with an opening laminated with a metal foil.

In a second embodiment there is provided another explosion-proof safety valve assemblage for use in a closed secondary battery comprising an outer container, an electrode element, consisting of a positive electrode, negative electrode and a separator, accommodated in said outer container, wherein said explosion-proof safety valve assemblage is sealingly secured to an open end portion of said outer container via an insulating gasket integrally with a closing cap, and said safety valve assemblage consists of a safety valve element, substantially the center of which is provided with a concavity, a coreless disc-shaped insulator, and a lead cap formed of a metal substrate laminated with a metal foil, substantially the center of which is provided with a projection.

According to claim 3, in the explosion-proof safety valve assemblage as claimed in the preceding claims, said concavity of the safety valve element and said projection of the lead cap, are laser welded or ultrasonically welded so that a current circuit is produced in the closed second battery.

According to claim 4, in the preceding safety valve assemblage, said lead cap is provided with a plurality of through holes for gas releasing.

According to claim 5, in the preceding safety valve assemblage, said safety valve element is formed of a metal substrate laminated with a metal foil.

According to claim 6, there is provided a closed secondary battery employing the above mentioned explosion-proof safety valve assemblage.

DETAILED DESCRIPTION OF THE PREFERRED EMBODIMENT(s) OF THE INVENTION

Preferred embodiments of the explosion-proof safety valve assemblage and the closed secondary battery according to the present invention are explained below with reference to the drawings.

Figure 1:
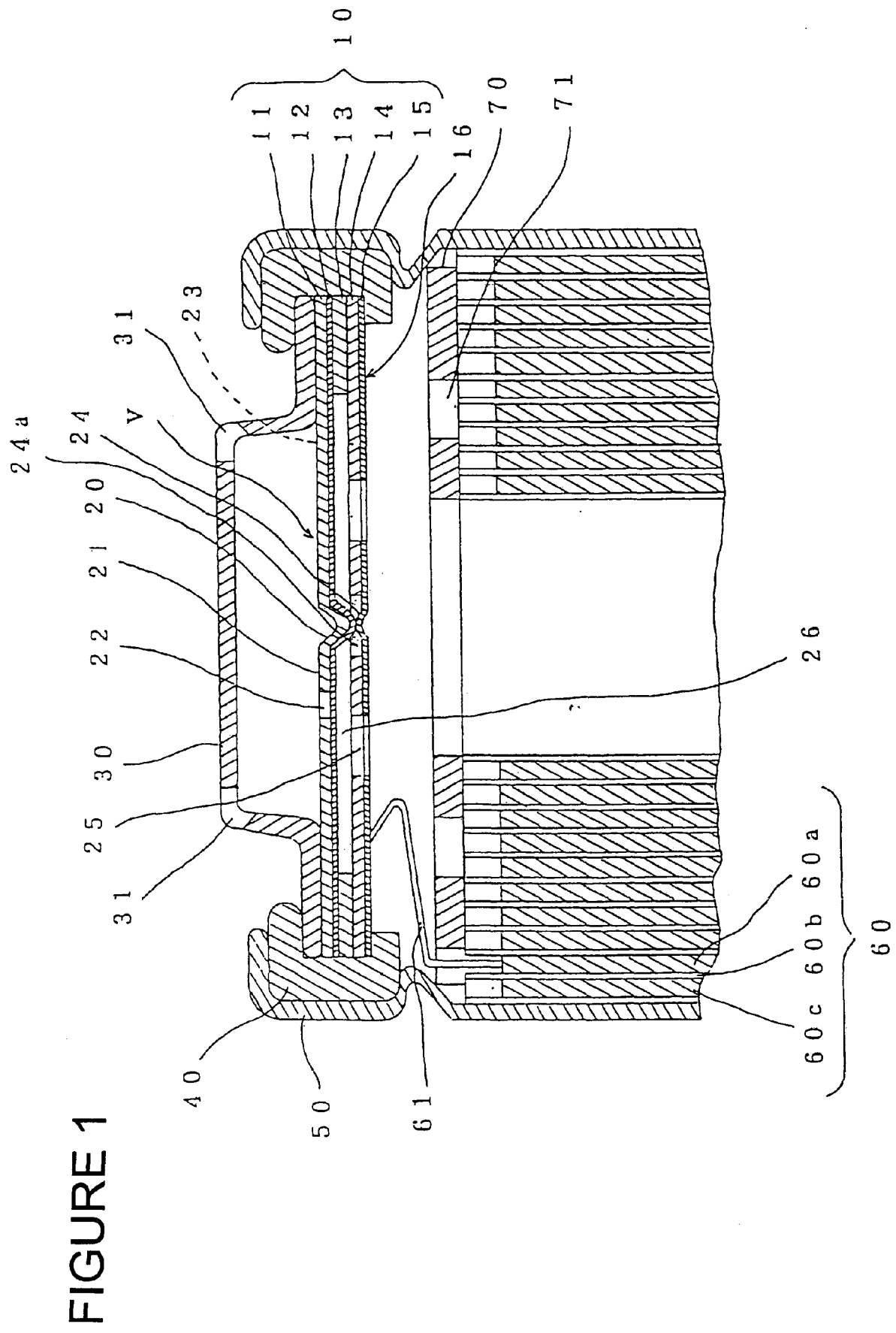
FIG. 1 is a section view showing the upper part of a closed secondary battery provided with an explosion-proof safety valve.
Figure 2:
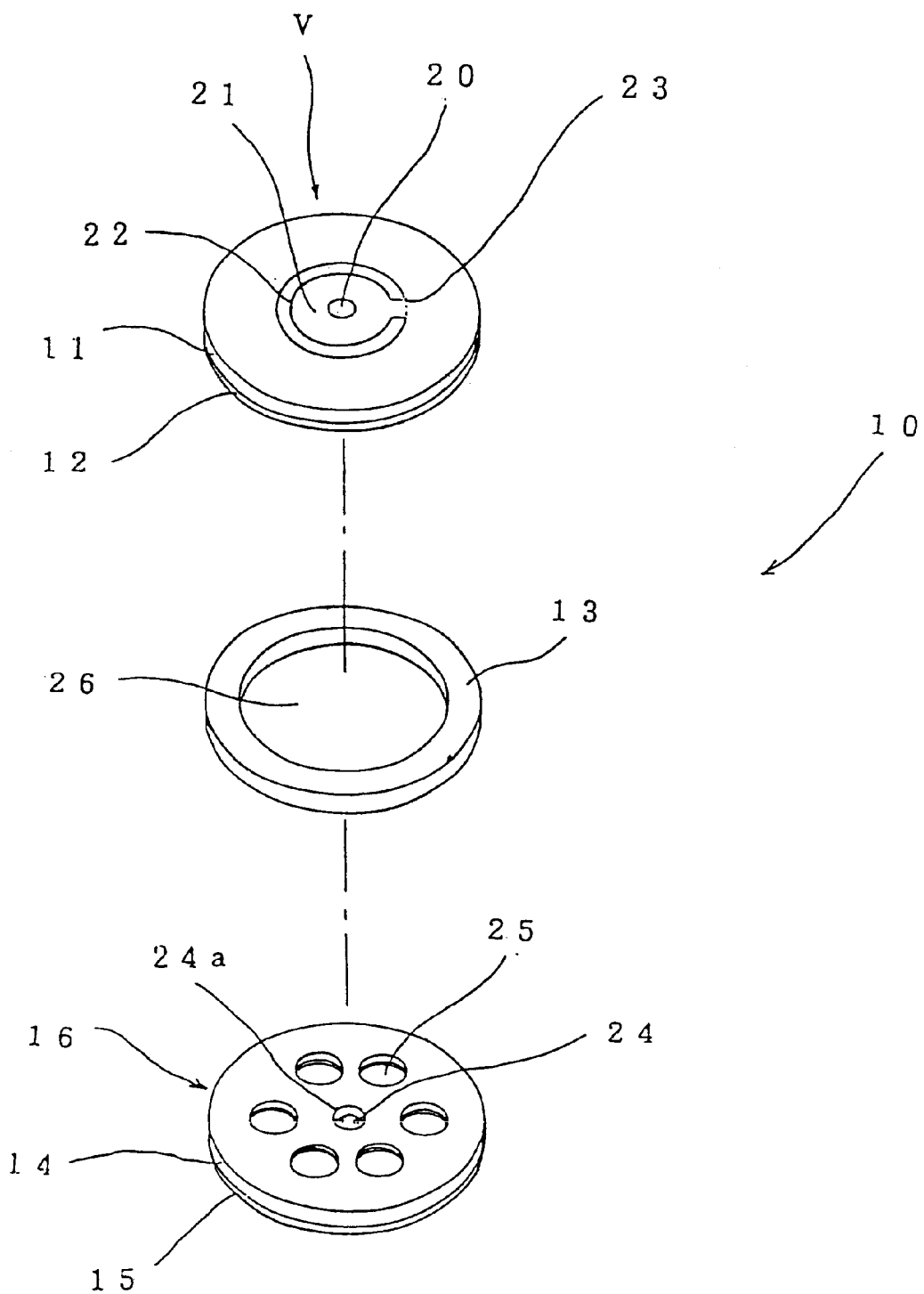
FIG. 2 is an exploded perspective view showing an explosion-proof safety valve element.
Figure 3:
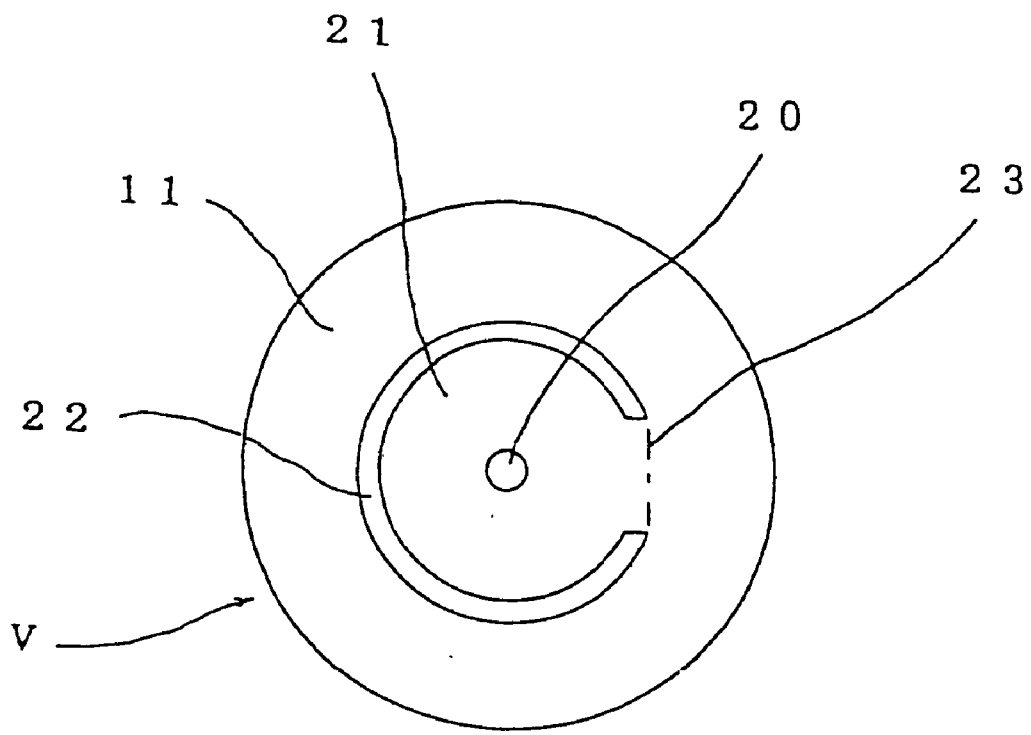
FIG. 3 is a front view and a section of the explosion-proof valve.
Figure 3:
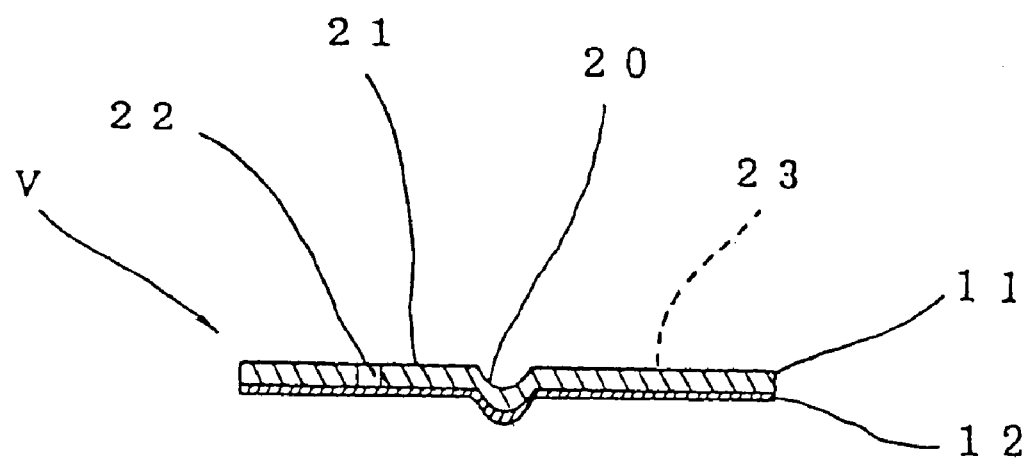
Figure 4:
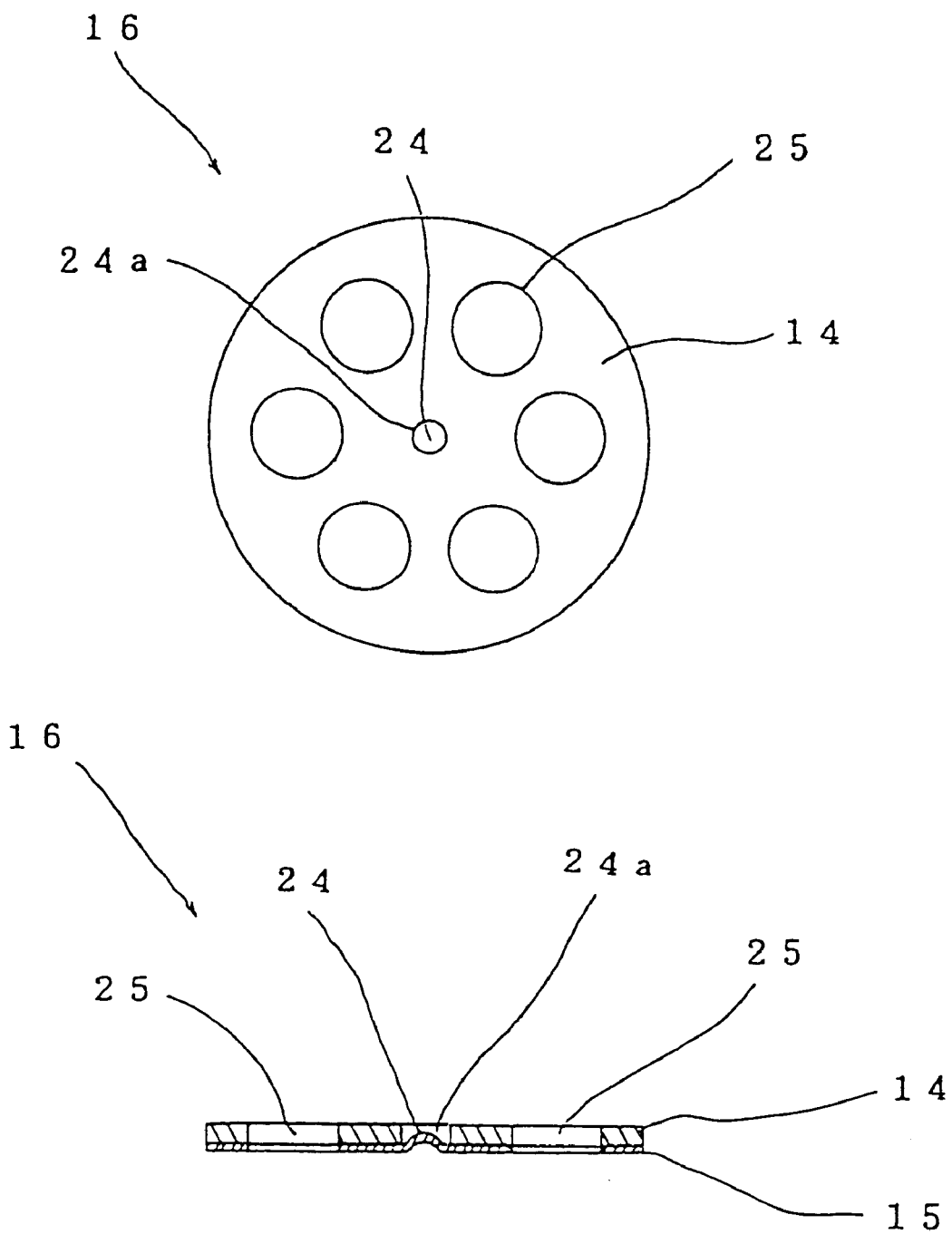
FIG. 4 is a front view and a section of a lead cap.
Figure 5:
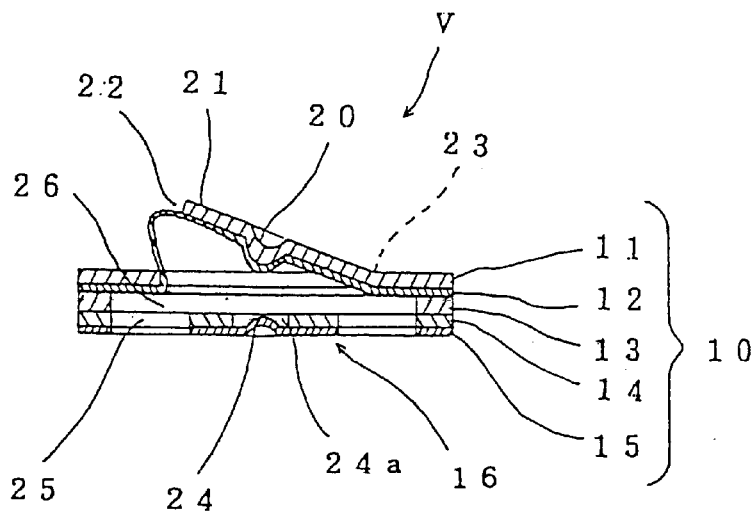
FIG. 5 is an explanatory view A of the operation manner of the explosion-proof safety valve in case of abnormality.
Figure 6:
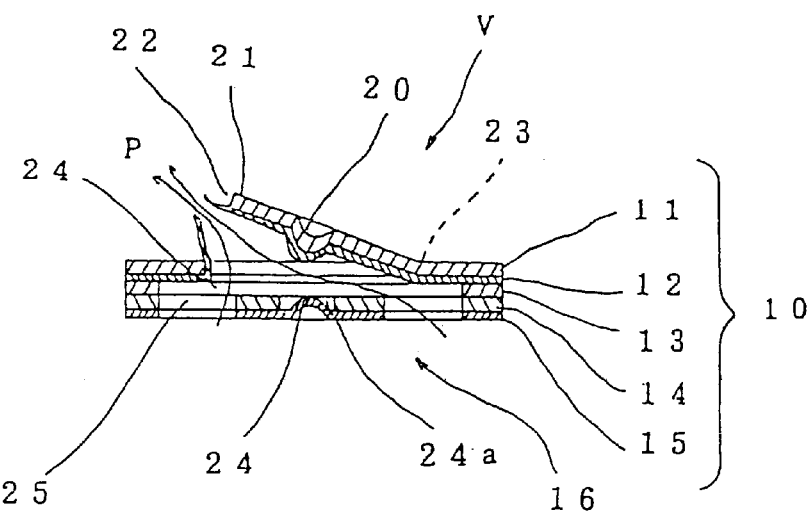
FIG. 6 is an explanatory view B of the operation manner of the explosion-proof safety valve in case of abnormality.

FIG. 1 is a section view showing the upper part of a closed secondary battery provided with an explosion-proof safety valve assemblage according to the present invention. FIG. 2 is an exploded perspective view showing members of the explosion-proof safety valve assemblage including a lead cap. FIG. 3 is a front view of the explosion-proof safety valve element and a section thereof. FIG. 4 is a front view of the lead cap and a section thereof. FIG. 5 and FIG. 6 are explanatory views showing the operation manners of the explosion-proof safety valve in case of abnormality, for instance, when the battery is overcharged with more than a rated current being supplied or the positive electrode and the negative electrode are short-circuited to flow a large current in the battery.

As shown in FIG. 1, an electrode element 60 is accommodated in an outer container 50 which also serves as a negative electrode terminal. The electrode element 60 consists of a positive electrode 60a, a separator 60b, and a negative electrode 60c, which are laminated together and coiled in a vortical form. A closing cap 30 serving as both an explosion-proof safety member and a positive electrode terminal is formed in a shape of a cap and provided with through holes 31 for gas releasing, and calked to be fitted in an upper open end portion of the outer container 50 via an insulating gasket 40 together with an explosion-proof safety valve assemblage 10 having a lead cap 16. The closing cap 30 is disposed facing to the electrode element 60. Between the closing cap and the electrode element, the explosion-proof safety valve assemblage 10 having the lead cap 16 is disposed.

The explosion-proof safety valve assemblage 10 consists of an explosion-proof safety valve element V, an insulator 13, and the lead cap 16 in this order from the upper, and they are substantially coaxially located with regard to the closed secondary battery.

The safety valve element V has its center portion wrought to have a prescribed concavity 20, which is to come into contact with a projection 24 formed at the center of the lead cap 16 so as to provide a current circuit in the closed secondary battery.

The contacting portion of the prescribed concavity 20 of the safety valve element V and the projection 24 of the lead cap 16 may be laser welded or ultrasonically welded so that the current circuit can be reliably established.

The above mentioned valve element V consists of a metal substrate 11 and a metal foil 12 which is laminated to the lower surface of the metal substrate 11. The metal substrate 11 is provided with a valve 21 in a desired shape.

The above mentioned insulator 13 is provided with a large hole 26 serving also a gas releasing hole at the center portion thereof. The above mentioned lead cap 16 consists of a metal substrate 14 and a metal foil 15 which is laminated to the lower surface of the metal substrate 14. The metal substrate 14 is provided at the center thereof with an opening 24a in which the prescribed projection 24 is to be formed for providing a current circuit in the battery. Besides, a plurality of holes 25 for gas releasing are perforated through the entire thickness of the metal substrate 14 and the metal foil 15. They are located in an arrangement concentric with the lead cap.

On the other hand, a portion of the metal foil 15, which is exposed in the above mentioned opening formed at the center of the lead cap 14, is wrought to be the prescribed projection 24 for producing a current circuit between the above mentioned valve element V and the interior of the battery as mentioned above.

A retainer plate 70 having a plurality of holes 71 for gas releasing is disposed above the electrode element 60. A positive electrode lead 61 has one end thereof connected to a positive electrode 60a of the electrode element 60 through a peripheral slit of the retainer plate 70 and the other end thereof connected to a lower surface of the lead cap 14.

As shown in FIG. 2, the above mentioned safety valve assemblage 10 has an arrangement of, in order from the upper, the valve element V, the insulator 13, and the lead cap 16.

The valve element V has a circular shape, for example, as shown in the plan view of FIG. 3, and consists of the metal substrate 11 and the metal foil 12 laminated to the lower surface of the metal substrate 11. The metal substrate 11 is provided with the valve 21 in a prescribed shape.

A space 22 having an interval concentrically is pierced through the entire thickness of the metal substrate 11 depending on the shape of the valve 21 shown in FIG. 3. Accordingly, when the metal substrate 11 is seen from above, a portion of it can be seen that metal foil 12 exposes itself in the above mentioned concentrically formed space 22.

The above mentioned portion of the metal foil 12 exposed in the concentrically formed space 22 will be deformed when subjected to a pressure of the gas generated in the battery. At this time, the valve 21 is transformed not directly by the pressure of the gas, but indirectly transformed in accordance with the deformation of the portion of the metal foil 12 exposed in the concentrically formed space 22 due to the pressure of the gas generated in the battery. When the valve 21 is transformed, a connecting portion of the metal substrate 11 and the valve 21 forms a non-breaking portion, which forms into a fulcrum portion 23. Thus, a bending force is applied to the valve 21 with the fulcrum portion 23 as a bending fulcrum.

As to the shape of the valve, any shape may be selected, as far as its mechanism as the explosion-proof safety valve is not lost. Namely, as previously described, the very metal foil 12 laminated to the lower surface of the metal substrate 11 is directly deformed by the pressure of the gas generated in the battery. The valve 21 formed in the metal substrate 11 is not directly transformed by the pressure of such gas. That is, the valve 21 formed in the metal substrate 11 is indirectly transformed in accordance with the deformation of the metal foil 12 by the pressure of the gas generated. Therefore, the shape of the valve 21 can be optionally selected. For instance, if it is desired to make the valve operate at a lower pressure, the valve may have a smaller surface area. To decrease the surface area of the valve is, in other words, to increase the surface area of the exposed portion, which can be seen from above, of the metal foil 12 in the metal substrate 11.

After the metal foil 12 is laminated to the lower surface of the metal substrate 11 to form the valve element V, the center portion thereof is wrought to have a prescribed concavity 20. The working operation to form the prescribed concavity 20 may be performed simply by forming a concavity 20 on the upper surface of the valve element V using a pressing machine or the like, for example. Various shapes of concavity can be easily formed by controlling forces applied to the upper surface of the valve element or changing tools so that a desired shape of the concavity 20 can be obtained. Thus, the concavity may be formed into a spherical, cylindrical, regular hexahedral, or hexahedral shape, for example.

As a material for the metal substrate 11, steel sheet, stainless steel sheet, copper sheet or aluminum sheet may be used. On the other hand, a material for the metal foil 12 includes steel foil, stainless steel foil, copper foil, aluminum foil or nickel-iron alloy foil.

The insulator 13 is a coreless disc as shown in FIG. 2. At substantially the center of this hole, i.e., the coreless portion, the above mentioned prescribed concavity 20 formed at the center of the valve element V and the prescribed projection 24 formed at the center of the lead cap come into contact with each other to establish the current circuit of the closed secondary battery. The central large hole 26 of the insulater 13 serves as a gas releasing hole as well.

The above mentioned lead cap 16 has a circular shape, for example, as shown in the plan view of FIG. 4 and consists of the metal substrate 14 and the metal foil 15 laminated to the lower surface of the metal substrate 14.

The above mentioned substrate 14 has the opening 24a perforated at the center thereof and the metal foil 15 is laminated to the metal substrate. Then, the metal foil 15 is provided with the projection 24 for establishing the current circuit of the closed secondary battery together with the above mentioned valve element. The plurality of through holes 25 for gas releasing is formed in the arrangement concentrical with the lead cap. The through holes 25 for gas releasing are perforated through the entire thickness of the metal substrate 14 and the metal foil 15, and they may have any shape as far as they do not lose their effect and the number of the holes may be optionally selected. For example, two to six circular holes or elliptical holes whose center portions are curved along the direction of the outer circumference of the lead cap may be provided for gas releasing. The operation for forming the prescribed projection 24 at the center portion of the lead cap may be simply performed by working on the surface of the metal foil 15 of the lead cap 16 using the pressing machine or the like to form the projection 24.

Various shapes of the projection can be easily formed by controlling forces applied to the surface of the metal foil or changing tools so that a desired shape of the projection 24 can be obtained. Thus, the projection 24 may be formed into a spherical, cylindrical, regular hexahedral, or hexahedral shape, for example.

As a material for the metal substrate 14, steel sheet, stainless steel sheet, copper sheet or aluminum sheet may be used. On the other hand, a material for the metal foil 15 includes steel foil, stainless steel foil, copper foil, aluminum foil or nickel-iron alloy foil.

In the closed secondary battery having such a structure, when the battery is supplied with more than a rated current, for example a large current due to overcharging, the electrolyte is decomposed to generate gas. The generated gas fills the outer container 50 of the second battery, whereby the internal pressure of the battery is elevated. The internal pressure is propagated through the plurality of gas releasing holes 25 of the lead cap 16 and the large hole 26 at the center portion of the insulator 13, to the above mentioned metal foil 12 of the valve element V located above the large hole 26.

The metal foil 12 is laminated to the lower surface of the metal substrate 11 and consists of the components of the valve element V and calked to the upper open end portion of the outer container 50 via the insulating gasket 40 together with the insulator 13 and the lead cap 16. Accordingly, when the pressure reaches to a predetermined value, the portion of the metal foil 12 exposed in the concentrically formed space 22 is deformed by the pressure of the gas generated in the battery as shown in FIG. 5.

At this time, the connecting portion of the metal substrate 11 and the valve 21 form a non-breaking portion, which becomes the fulcrum portion 23 in accordance with the transformation of the portion of the metal foil 12 exposed in the concentrically formed space 22 by the pressure of the generated gas, whereby a bending force is applied to the valve 21 with the fulcrum portion 23 as a bending fulcrum and the valve 21 is raised up to transform itself.

Accordingly, the current circuit of the battery having been composed of the valve element V and the lead cap 16 is now disconnected as shown in FIG. 5 and the large current no longer flows into the battery. Subsequently, as shown in FIG. 6, the above mentioned portion of the metal foil 12 exposed in the concentrically formed space 22 ruptures in order to reduce the elevated internal pressure, and release the generated gas P outside the battery through the through holes 31 of the closing cap 30 shown in FIG. 1.

It is to be noted that the transformation of the valve 21 formed in a desired shape in the metal substrate 11 and that of the portion of the metal foil 12 exposed in the concentrically formed space 22 are both plastic deformation. Therefore, once the current circuit is broken, it is neither connected again, nor is the ruptured portion is recovered.

As explained above, according to the present invention, the lead cap is integrally formed with the safety valve and serves to establish the current circuit of the battery instead of the conventional one composed of lead plate or lead wire. Therefore, it is possible to delete some manufacturing man-hour in the process for precision working and positioning, which is required for the lead plate or lead wire. It is also possible to provide a closed secondary battery provided with explosion-proof safety valve assemblage using such economical and safety lead cap that allows the yield of the product to be enhanced and the manufacturing cost thereof to be reduced.

EXPLANATION OF REFERENCE CHARACTERS

V: explosion-proof safety valve element
P: generated gas
10: explosion-proof safety valve assemblage
11: metal substrate
12: metal foil
13: insulator 14: metal substrate
15: metal foil
16: lead cap
22: space
23: fulcrum portion
24: projection
24a: opening for projection
25: gas releasing hole of lead cap
26: hole for gas releasing of insulator
30: closing cap
31: through hole
40: insulating gasket
50: outer container
60: electrode element
60a: positive electrode
60b: separator
60c: negative electrode
61: positive electrode lead
70: retainer plate
71: hole for gas releasing of retainer plate

What is claimed is:

1. An explosion-proof safety valve assemblage for use in a closed battery comprising:

a outer container, an electrode element, having a positive electrode, negative electrode, and a separator, accommodated in said outer container, said explosion-proof safety valve assemblage being secured to an open end portion of said outer container via an insulating gasket integrally with a closing cap;

said explosion-proof safety valve assemblage having an explosion-proof safety valve element, a coreless disc-shaped insulator, and a lead cap composed of a metal substrate having an opening at a center portion thereof and being laminated with a metal foil;

said explosion-proof safety valve element having a metal substrate laminated with a metal foil;

said valve consisting of said metal substrate provided with a single continuous concentrically formed space perforated through the entire thickness of the metal substrate so that the metal foil is concentrically exposed; and both ends of said concentrically formed space ending at a single non-breaking portion at a connecting portion of the metal substrate and the valve.

2. The explosion-proof safety valve assemblage according to claim 1, wherein said concentrically exposed metal foil is directly transformed by pressure of generated gas and as a result said valve indirectly transforms at the non-breaking portion as a bending fulcrum.

3. The explosion-proof safety valve assemblage according to claim 1, wherein said lead cap is provided with a plurality of through holes for gas releasing.

4. The explosion-proof safety valve assemblage according to claim 1, wherein said explosion-proof safety valve element is composed of a metal substrate laminated with a metal foil.

5. A closed secondary battery using the explosion-proof safety valve assemblage according to claim 1.

6. An explosion-proof safety valve assemblage for use in a closed battery comprising:

an outer container, an electrode element having a positive electrode, negative electrode, and a separator, accommodated in said outer container, said explosion-proof safety valve assemblage being secured to an open portion of said outer container via an insulating gasket integrally with a closing cap;

said explosion-proof safety valve assemblage having an explosion-proof safety valve element having a concavity at a substantially center portion, a coreless disc-shaped insulator, and a lead cap composed of a metal substrate having a projection at substantially a center portion and being laminated with a metal foil;

said explosion-proof safety valve having a metal substrate laminated with a metal foil;

said valve including said metal substrate provided with a single continuous concentrically formed space perforated through an entire thickness of the metal substrate so that the metal foil is concentrically exposed; and both ends of said concentrically formed space ending at a single non-breaking portion at a connecting portion of the metal substrate and the valve.

7. The explosion-proof safety valve assemblage according to claim 6, wherein the concavity of said explosion-proof safety valve assemblage is bonded to the projection of said lead cap by laser welding or ultrasonic welding so that a current circuit is produced in a closed second battery.

* * * * *